United States Patent Office 3,275,265
Patented Sept. 27, 1966

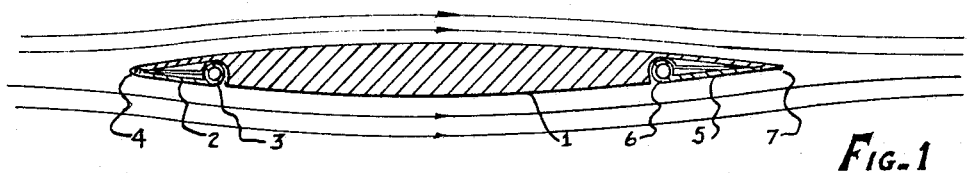
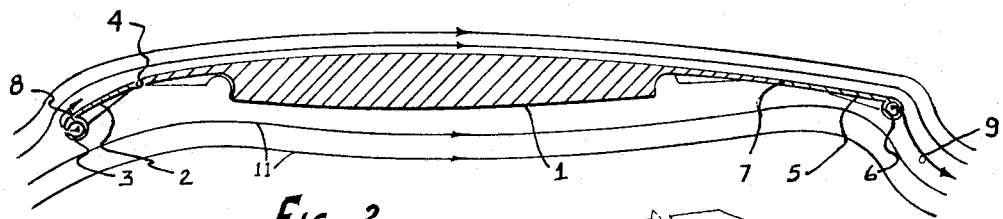
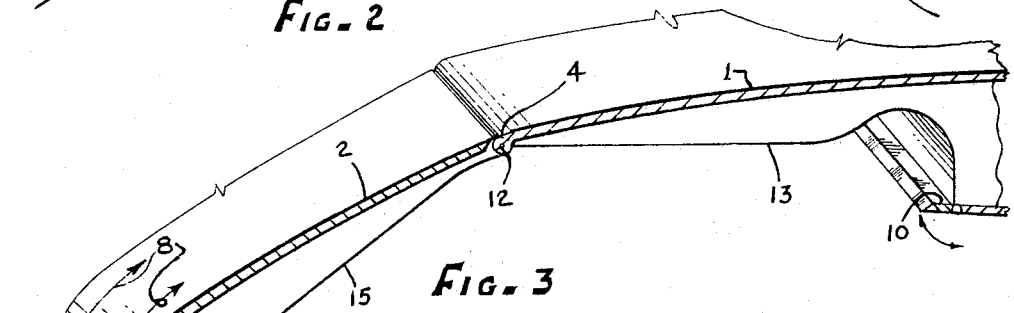
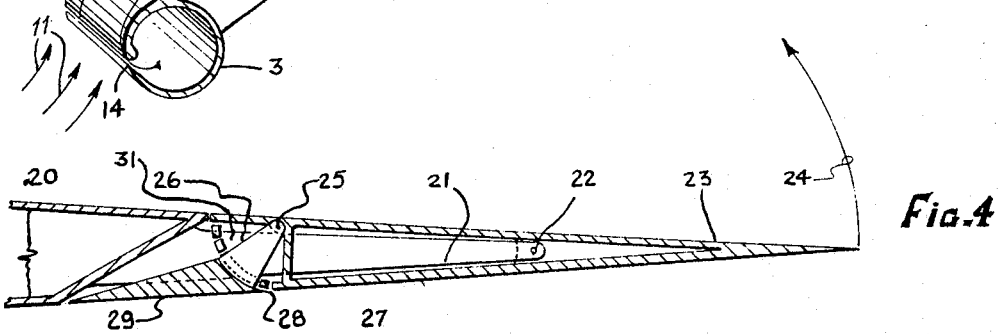
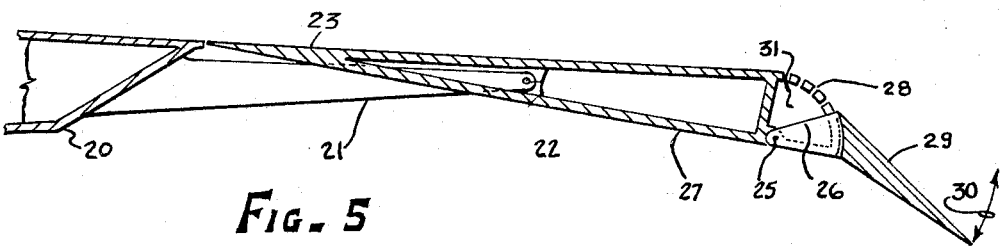

3,275,265
BOUNDARY LAYER CONTROL FLAPS AND
APPARATUS THEREOF
Alberto Alvarez-Calderon, 1560 Castilleja St.,
Palo Alto, Calif.
Filed July 27, 1962, Ser. No. 212,975
5 Claims. (Cl. 244—42)

The present invention relates to high lift devices for aircraft wings. More specifically, this invention concerns new structures for boundary layer control (BLC) on wings which have a variable chord and camber.

The application of BLC to increase the lift of aircraft wings is a well known method which in recent years has found application in military aircraft. Generally speaking, however, there are still several problems associated with BLC installations which in fact have prevented installation of such systems on commercial aircraft. From the aeronautical viewpoint, some of these problems are a high power consumption by the BLC system which has to be furnished by the installed power plants in the aircraft; the structural complications associated with the installation of BLC ducting adjacent to the leading and trailing edges of the wing, which problems are so serious as to prevent the use of area increasing flaps with BLC; and finally, there should be mentioned the near impossibility of providing efficient BLC sources in the very edges of the thin wings because these thin edges have virtually no volume within which there can be housed an efficient BLC duct, and because these thin edges are usually sharp and therefore aerodynamically unsuitable for a high lift flow in which there is a strong upwash and in which there may be a strong change of the circulatory component of lift. The use of area increasing flaps is desirable to obtain the increments of lift due to increasing area. In the case of BLC flaps, and for a required total wing lift the increment of lift due to area is desirable to reduce the increment of lift, and therefore the power required, from a BLC system. However, area increasing flaps of conventional design would be an extremely complicated system and have not been attempted yet even in military aircraft.

It is one purpose of this invention to provide a high speed high lift wing with BLC in which in the high lift condition the BLC devices are located at the upstream and downstream wing edges themselves rather than at a discreet distance inwards from the edges, as is usually the case with the known BLC systems on standard flaps. (See for instance U.S. Patent No. 3,009,668 and No. 3,012,740, or British Patent No. 613,258.)

Yet another object of this invention is to provide a high lift thin wing in which the leading and trailing edges of the wing are sharp for high speed flight; but in which the leading and trailing edges for high lift flight are extended in chord and changed in cross-sectional area to a rounded and relatively thick shape, and in which BLC acts at the spanwise edges of the wing flap combination in the high lift disposition.

Yet another object of this invention is to provide a high lift system with a BLC in which the upper surface of the wing has no skin interruptions due to BLC devices, thereby reducing the skin drag of the wing by providing a smooth uninterrupted upper surface.

Yet another object of the invention is to provide a high lift system of the type described using chord and camber increasing spanwise panels which have greatly reduced hinge moment and reduced contribution to the wing's pitching moments.

One more object of the invention is to provide a high lift system for thin wings which has in the high lift condition a rounded leading and/or trailing edge with a circulation control vane to fix a value of lift in the wing without changing the wing's angle of attack or incidence, but yet by means of an ingenious and novel mechanical system, this rounded trailing edge can be chagned to a thin trailing edge suitable for supersonic flight or for efficient low drag flight without continuous application of BLC power.

Yet another object of the invention is to provide a mechanically simple area and camber increasing pivoted flaps with BLC tubes installed in a spanwise direction at the chordwise extremities of the wing flap combination when the flaps are in their high lift position.

One more object of the invention is to provide flaps described in the previous paragraph which have greatly reduced pitching and hinge moments as well as auxiliary flap members to control the circulatory lift on the wing.

These and other objects of this invention will become more readily apparent from a perusal of the description of various embodiments illustrated in the drawings in which:

FIGURE 1 shows a cross-sectional view of a high speed wing in the high speed condition, incorporating my BLC high lift system shown in the retracted position.

FIGURE 2 shows in cross-sectional view the wing of FIGURE 1 but with my BLC high lift system in the high lift position with the BLC tubes located at the edges of the wing.

FIGURE 3 shows a detail of the leading edge BLC tube structure shown in FIGURE 2; generally speaking, it is also applicable to the trailing edge device of the type shown in FIGURE 2.

FIGURE 4 shows in cross-sectional view the trailing edge portion of a wing incorporating an alternate BLC high lift system which has aerodynamic balance in the flap and circulation control device to be more clearly explained in the text describing the figure.

FIGURE 5 shows a structure of FIGURE 4 in the high lift position.

With initial reference to FIGURE 1, I show therein in cross-sectional view a high speed wing section 1 in the high speed condition having a sharp leading edge 4 and a sharp trailing edge 7. As it is shown in the drawings, edges 4 and 7 are inclined at a substantial angle to the normal direction of motion of wing 1; motion of the wing produces the relative fluid streamline pattern illustrated in the figure, and edges 4 and 7 are therefore in a direction generally out of the paper. For the case of wing edges without sweep, edges 4 and 7 would be perpendicular at 90° to the paper; for the case of swept wings, they would be inclined to the paper at a different angle. The upper surface of the wing is shown without surface interruptions for very low skin drag. On the lower surface of the wing in the leading edge portion, there is shown a spanwise door 2 having in its inward edge a BLC tube 3 housed within the wing cross-section, and in its outward edge having a pivotal connection to the wing leading edge 4. It is seen that door 2 forms a smooth fairing of the lower forward surface of wing 1.

At the trailing edge portion of wing 1, there is shown another spanwise door 5 having in its inward edge a BLC tube 6 housed within the cross-section of wing 1, and in its outward edge it is shown having a pivotal connection to wing trailing edge 7. The type of flow obtained with a wing of FIGURE 1 is seen by inspection to be a smooth flow suitable for supersonic flight.

In FIGURE 2, I show the wing of FIGURE 1 in the high lift condition in which the flow is highly curved and with a strong upwash and downwash as indicated by flow arrows 11. In FIGURE 2 wing 1 is shown in cross-sectional view but the spanwise doors, which in FIGURE 1 were retracted, are now shown extended to an area and camber increasing position which at the same time located the BLC tubes in a spanwise direction at the chordwise extremities of the wing-flop combination. At the wing leading edge portion, there is shown door 2 positioned as an extension of the wing chord and with BLC tube 3 at the leading edge proper of the combination, ejecting a high speed BLC sheet of air 8 which serves to promote attached high lift flow at the wing leading edge portion of the wing. Spanwise door 2 has been displaced from the position shown in FIGURE 2 by means of clockwise angular motion of door 2 about its pivotal axis at 4.

At the wing trailing edge portion in FIGURE 2, there is shown spanwise door 5 forming a chordwise increment of wing 1 and supporting in its outward spanwise edge a BLC tube 6 which ejects downwardly a high speed sheet of air 9 which serves to produce a large lift on wing 1.

It is evident by inspection that the flap mechanism is extremely simple and therefore can be used for area extension of BLC flaps. For a total required wing lift coefficient, the increment of lift due to area obviously subtracts from the increment of lift due to BLC. Thus, the power required for BLC diminishes. An exemplary commercial appreciation of the system is a near-sonic high speed aircraft with thin wings approximately 9% chord thick, and of reduced sweepback of approximately 15 degrees.

Referring now to the rest of the drawings, FIGURE 3 shows in cross-sectional view the leading edge portion of the structure of FIGURE 2. Specifically, FIGURE 3 shows a wing leading edge portion 1 having a wing leading edge 4 at which edge there is supported a spanwise camber and area increasing door 2 at spanwise pivotal axis 12. At the outward edge of door 2, there is shown a BLC tube 3 which has a spanwise slit 14 through which there issues a sheet of BLC air shown schematically as S. The leading edge door 2 has ribs 15 at discreet spanwise stations. My leading edge is retracted by counterclockwise angular motion of door 2 and tube 3 about spanwise axis 12 into recession 13, for which purpose there is shown a small auxiliary movable fairing plate 10 which moves downward as shown by the pertinent arrow in order to permit door 2 and BLC tube 3 to enter to and emerge from wing recession 13. Plate 10 together with door 2 in its retracted position form a smooth leading edge under surface to wing 1.

The mechanical means to extend and retract my high lift device will be described at a later portion of this specification.

It is evident by inspection of the trailing edge portion of FIGURE 2 and the structure of FIGURE 3 that the mechanism described in FIGURE 3 is also applicable to serve as a trailing edge flap of the type shown in FIGURES 2 and 1, therefore I will not show a separate detailed drawing of the trailing edge structure of FIGURE 2. Instead, I will show an alternate form of my invention which may be incorporated to a wing in a manner similar to that shown in FIGURES 1 and 2 by the installations and modification shown in FIGURES 4 and 5.

In FIGURE 4, I show the trailing edge of a swing shown as 20 supporting in the high speed condition and by means of a rear-wardly protruding flap bracket 21, a trailing edge flap 27, pivotaly connected to bracket 21 at spanwise pivotal axis 22. Trailing edge flap 27 is shown positioned for high speed flight having a thin edge 23 in a downstream position from the trailing edge of wing and flap bracket; flap 27 is also shown having a thick edge adjacent to wing trailing edge 20 and having a BLC tube 31 with a porous wall with pores 28 and with a vane and bracket combination 29 and 26 respectively which serves in the high speed condition as a lower wing surface fairing between wing 20 and flap 27. The flap described so far has been shown in the high speed position; to move the flap 27 to the high lift position, it is rotated about spanwise axis 22 in a counter clockwise direction 24 by approximately 180 degrees with respect to wing 20, and vane-and-flap combination 29–25 are rotated by about 45 degrees in a clockwise direction with respect to flap 27. The resulting structure is shown in FIGURE 5: I show therein that flap 27 has ben flipped around to have its thin edge 23 adjacent to and forming a continuation of the trailing edge of wing 20, the flap now has its BLC tube 31 at the downstream edge of the wing-flap combination. Evidently, the application of suction on tube 31 will suck inwards the BL air on the upper surface of the wing and flap through spanwise holes or pores 28 to enable the flow to bend around vane 29 in order to produce the trailing high lift flow of the type shown in FIGURE 2. Additional motion of vane and bracket combination 26–29 with respect to flap 27 and according to arrow 30 will permit a variation of wing lift without varying the angle of attack of wing 20. The type of structure shown in FIGURES 4 and 5 can also be installed advantageously at the leading edge of aircraft wings according to the general mechanism and relative disposition of parts shown in these figures.

It should be observed that the flap hinge moment of flap 27 with respect to wing 20 is greatly reduced because throughout the motion of flap 27 along arc 24—as is evident by inspection—there is a considerable aerodynamic balance effect for any deflection of flap 27. For instance, when flap 27 is vertical, approximately one-half of it is below and one-half of it above pivot axis 22 and therefore the resultant force on the flap acts very close to the flap pivotal axis to thereby reduce flap hinge moments at axis 22 to negligible values. This fact, in itself, reduces the contribution to wing pitching moments which are normally transmitted by means of flap hinge moment. In addition, however, the structure of FIGURE 5 when compared say to the trailing edge structure of FIGURE 2, reduces the wing pitching moments by having the location of the negative flap pressure peak closer to the wing aerodynamic axis; this is evident by geometric inspection of FIGURES 2 and 5.

In FIGURE 2, however, at the leading edge portion, the strutcure shown therein serves to greatly decrease the negative pitching moments contribution due to the flap's trailing edge negative pressure peak, by providing ahead of the wing's leading edge another negative pressure peak at tube 3 which is located at a considerable distance ahead of the aerodynamic axis of the wing. (The aerodynamic axis referred to here is located approximately at the quarter chord point of the mean average wing chord.) This latter feature described in connection to the pressure peaks mentioned hereinabove, and exemplified specifically in the structure in FIGURE 3, is of great advantage in order to improve the lift of the wing by decreasing the negative trim forces which normally are necessary to provide longitudinal trim for wings having high lift BLC flaps at the trailing edge of the wing. This negative trim loads may be of the order of twenty per cent of the gains of lift due to trailing edge flaps. Thus, it is seen that the ability of my flap of FIGURE 3 to greatly decrease the trim loads on the tail is of significance for the overall lift efficiency of a high lift wing incorporated into an actual trimmed aircraft.

With reference to the specific details of construction of the BLC tubes shown in my invention, they may be blowing tubes of the type shown by tube 3 of FIGURE 3, suction tubes of the type shown by tube 31 of FIGURE 5 or even rotating cylinders of the type described in my patent application 48,038. They may also be collapsible, inflatable tubes with blowing BLC shown in FIGURES 1 and 2 of my U.S. patent application 157,423. They may also be constructed according to the information taught by U.S. Patents 3,009,668, 3,012,740, 2,934,288, and British 613,528; in the case of U.S. Patent 2,934,288, which describes inflatable leading edge tubes, my flap system described in this specification would be well suited to incorporate such tubes without BLC air, with the additional advantage of area increase in the wing. With respect to the specific mechanisms to extend and retract my spanwise pivoted doors of my invention, this may be constructed according to the structures shown in FIGURES 1 and 3 of my aforementioned patent application 157,423, or to other methods known in the flap art.

With respect to the means of energizing the BLC tubes, these probems are known in the art, see for instance the aforementioned U.S. patents of reference. It should be observed, however, that in my flaps, because the BLC tubes translate with respect to the wing, it is advantageous to install a flexible hose at one spanwise end of the BLC tube to connect the BLC tube to the energy source used to move fluids between the tube's interior and the surrounding airstream. Alternately, small turbines or air impellers can be mounted on the flap's inboard end adjacent to the BLC tube's end.

Various further modifications and alterations from those described hereinabove can obviously be made without departing from the spirit of this invention and the foregoing are to be considered purely exemplary application thereof. The actual scope of this invention is to be indicated by reference to the appended claims.

I claim:
1. An aircraft wing having an upper surface, a lower surface, a middle portion and a generally spanwise edge inclined at a substantial angle to the normal direction of motion of said wing through the air; and a spanwise door mounted on said wing adjacent to said spanwise edge and having a first door edge generally parallel to said spanwise edge and pivotally connected to said wing at a pivotal axis adjacent to said spanwise edge, a door second edge generally parallel to said door first edge and supporting a boundary layer control tube, and a door surface between said door edges; said door being mounted for rotational movement about said pivotal axis and with respect to said wing from a retracted door position in which said door has its surface adapted to generally conform to the lower contour of said wing adjacent said spanwise edge and is smoothly faired to said lower surface of said wing, with said tube being located substantially between the elevation of upper and lower wing surfaces and between said spanwise edge and middle portion of said wing, to an extended door position in which said door surface and tube are on the side of said spanwise edge of said wing opposite from said middle portion of said wing and said boundary layer control tube is remote from said upper and lower surfaces of said wing defining a thickened and generally spanwise edge portion for said wing.

2. An aircraft wing having a leading edge portion an upper surface, and a lower surface, the direction of flight determining an airstream direction on said wing; a spanwise door mounted on said lower surface and having a first door edge pivotally connected to said wing at a fixed axis adjacent to said leading edge portion and a second door edge remote from said leading edge portion generally parallel to said first door edge and supporting a boundary layer control tube having a crossectional area, in a generally chordwise plane, larger than the crossectional area of said leading edge portion in said chordwise plane; said door being mounted for movement between a retracted high speed position in which the surface of said door is smoothly faired with the lower surface of said wing with said boundary layer control tube being housed in said wing between the elevation of upper and lower surfaces of said wing on the downstream side of said leading edge, and an extended high lift position in which said door is inverted about said axis to a position upstream of said leading edge of said wing with the surfaces of said door augmenting the surfaces of said wing and inclined to said lower surface, and with said boundary layer control tube located substantially at the upstream edge of said door.

3. An aircraft wing having a trailing edge, an upper surface and, a lower surface, the direction of flight determining an airstream direction on said wing; and a spanwise door mounted on said lower surface and having a first door edge pivotally connected to said wing at a fixed axis adjacent to said trailing edge and a second door edge remote from said trailing edge generally parallel to said first door edge and supporting a boundary layer control tube; said door being mounted for movement between a retracted high speed position in which a surface of said door is smoothly faired with the lower surface of said wing with said boundary layer control tube substantially between the elevation of upper and lower surfaces of said wing on the upstream side of said trailing edge, and an extended high lift position in which said door is positioned downstream of said trailing edge of said wing with the surfaces of said door augmenting the surfaces of said wing and inclined to said lower surface, and with said boundary layer control tube located susbtantially at the downstream edge of said door.

4. An airfoil having a mid surface portion and a generally spanwise edge; a flap having a first flap edge approximately parallel to said spanwise edge, a second flap edge approximately parallel to said first flap edge, and a flap surface extending between said first and second edges; a boundary layer control tube mounted on said flap adjacent said second edge; said flap being supported by said airfoil at a pivotal axis fixed with respect to said airfoil and about which said flap and boundary layer control tube are adapted to be inverted from a high speed position in which said flap surface and said boundary layer control tube are adapted to be faired with said airfoil in a low drag disposition, to a high lift position in which said flap and boundary layer control tube are located inverted relative to said high speed position, and are located on the side of said pivotal axis opposite to said mid surface section.

5. The structure of claim 4 further characterized in that a vane is mounted on said flap adjacent said boundary layer control tube, said vane being positioned approximately parallel to said flap when said flap is in said high speed position and said vane being inclined at an angle to said flap when said flap is in said high lift position.

References Cited by the Examiner

UNITED STATES PATENTS

| | | | |
|---|---|---|---|
| 2,406,924 | 9/1946 | Stalker | 244—42 |
| 2,928,626 | 3/1960 | Tino | 244—42 X |
| 2,941,751 | 6/1960 | Gagarin | 244—42 |
| 3,089,666 | 5/1963 | Quenzler | 244—42 X |

FOREIGN PATENTS 550,713  1/1943  Great Britain.

FERGUS S. MIDDLETON, *Primary Examiner.*

EMILE PAUL, MILTON BUCHLER,
*Primary Examiners.*